US009547639B2

(12) United States Patent
Kim (10) Patent No.: US 9,547,639 B2
(45) Date of Patent: Jan. 17, 2017

(54) TYPING ERROR CORRECTION METHOD AND DEVICE IMPLEMENTING THE SAME METHOD

(71) Applicant: KEUKEY INC., Seoul (KR)

(72) Inventor: Min Chul Kim, Seoul (KR)

(73) Assignee: Keukey Inc. (KR)

( * ) Notice: Subject to any disclaimer, the term of this patent is extended or adjusted under 35 U.S.C. 154(b) by 0 days.

(21) Appl. No.: 14/145,791

(22) Filed: Dec. 31, 2013

(65) Prior Publication Data

US 2014/0344680 A1    Nov. 20, 2014

(30) Foreign Application Priority Data

May 16, 2013  (KR) .......................... 10-2013-0056054

(51) Int. Cl.
G06F 17/22         (2006.01)
G06F 17/27         (2006.01)
G06F 17/24         (2006.01)

(52) U.S. Cl.
CPC ...................................  *G06F 17/273* (2013.01)

(58) Field of Classification Search
CPC .................................................. G06F 17/2276
USPC .......................................................... 715/259
See application file for complete search history.

(56) References Cited

U.S. PATENT DOCUMENTS 5,761,689 A * 6/1998 Rayson ................. G06F 17/273
                                                                   715/210
6,801,190 B1 * 10/2004 Robinson et al. ............ 345/173
8,201,087 B2 * 6/2012 Kay et al. ...................... 715/257
2005/0273713 A1 * 12/2005 Soin et al. ..................... 715/531
2006/0253427 A1 * 11/2006 Wu et al. .......................... 707/3
2008/0077396 A1   3/2008 Hsu
2009/0083028 A1 * 3/2009 Davtchev et al. ................ 704/9
2009/0254819 A1 * 10/2009 Song et al. ..................... 715/257
2010/0251107 A1 * 9/2010 Oh ................................. 715/269
2012/0130706 A1 * 5/2012 Qiu et al. .......................... 704/9
2012/0268381 A1 * 10/2012 Unruh ........................... 345/168
2012/0296627 A1 * 11/2012 Suzuki et al. .................... 704/2
2012/0304057 A1 * 11/2012 Labsky et al. ................ 715/256

(Continued)

OTHER PUBLICATIONS

International Search Report dated Jan. 21, 2014 issued by KIPO for International Application No. PCT/KR2013/011142 corresponding to Korean Application No. 10-2013-0056054 (3 pages).

*Primary Examiner* — James J Debrow
(74) *Attorney, Agent, or Firm* — Dinsmore & Shohl LLP; Yongsok Choi (57) ABSTRACT

A typing error correction method and a device implementing the same method are provided. A correction method includes the following: every time when a user inputs characters, a correlation between the newly input characters and the character substrings of the already input words having the same length as the newly input characters is calculated; in case the correlation exceeds a predetermined value, such character substring of already input word is registered in a correction candidate list; in case there is only one correction candidate in the list, the candidate substring in the list is replaced by the newly input characters according to correction command; in case there are more than one correction candidates in the list, a user's move command is input for selection, and the selected candidate substring is replaced by the newly input characters.

12 Claims, 4 Drawing Sheets

(56) References Cited

U.S. PATENT DOCUMENTS

2013/0006613 A1  1/2013  Karov Zangvil et al.

* cited by examiner

TYPING ERROR CORRECTION METHOD AND DEVICE IMPLEMENTING THE SAME METHOD

CROSS-REFERENCE TO RELATED APPLICATION

This application claims priority to and the benefit of Korean Patent Application No. 10-2013-0056054, filed on May 16, 2013 in the Korean Intellectual Property Office, the disclosure of which is incorporated herein in its entirety by reference.

BACKGROUND

1. Field

The present invention is directed to a typing error correction method and a device implementing the same method. The method according to embodiments of the present invention can be applied to a keyboard input of personal computers as well as to a touch keypad input of smart phones and keypad input of all mobile devices (including feature phones).

2. Description of the Related Art

Typical typing error (e.g., typographical error) correction method when inputting characters (all types of inputtable characters including English characters, Korean characters, numbers, special characters, etc.) in personal computers or in mobile devices is to delete not only the word including a typing error but also all words between the word including the typing error and the current cursor location using deletion function key like backspace, and to retype the whole deleted words, or to move a cursor to the location where the typing error occurred using a mouse (in case of personal computers) or using a finger touch (in case of mobile devices) to correct the typing error.

When moving a cursor to the location where a typing error occurred by using a mouse or finger touch, a user should pay attention to indicating the exact location of the cursor. In case of mobile devices having a small display, additional features such as a magnifying glass function may be used to help user's cursor location indication. After moving the cursor to the accurate location right after the characters including the typing error, the user deletes the characters including the typing error by inputting (e.g., pressing) a delete function key. After such deletion, the user types correct characters. When changing a whole word to another word, the user should move the cursor to the location right after the word to be revised in the above manner, delete the whole characters in the word, and then type another word.

An auto-correction function was developed in an effort to reduce inconvenience caused by the above conventional typing error correction method. This function has been already commercialized, and works to automatically correct the word "A," which a user actually typed, to another word "B," when the machine decides that the word "A" contains a typing error and should be corrected to the word "B." Thus, it may help to reduce a user's effort to input a deletion function key and to type correct words again. Automatically corrected word "B" exists in a library of the machine, and is not required to be retyped by a user.

However, in the above auto-correction function, it is apparent that the automatically corrected word is not input by a user with the intention of correction, but is what the machine presumes that the user actually intended to input. Thus, problems may arise when the accuracy of presumption is not good enough. The problematic accuracy of presumption is partly because of the limited number of words registered in a library of the machine. Further, it is partly due to an inaccuracy occurring when the machine selects one correction candidate from among a plurality of correction candidates. These days, many users frequently use newly coined words or new abbreviations, which are not covered by the old library, in typing environment of personal computers and mobile devices. Thus, if the library is not frequently updated, the limitation of the library becomes more and more remarkable. For this reason, many users turn the auto-correction function off when they input characters, even though their devices (e.g., personal computers or mobile devices) are provided with the auto-correction function. For inputting non-English languages, users tend to more frequently turn the auto-correction function off. In particular, in case of Korean language, users do not generally care about spacing between words when they type particularly in mobile devices. Under such circumstances where words are not typed to be appropriately spaced from each other, it is very difficult for the machine to recognize actual typing errors and suitable replacement of typing errors. This is the reason why most users turn the auto-correction function off when inputting Korean language characters.

SUMMARY

In embodiments according to the present invention, a correction method of a word or a character substring is provided. The method includes: calculating a correlation between newly input characters and character substrings of already input words having the same length as the newly input characters whenever a user inputs characters; in case the correlation exceeds a predetermined value, registering such character substring of already input word in a correction candidate list; in case there is only one correction candidate in the correction candidate list, replacing the character substring in the correction candidate list with the newly input characters according to a correction command of the user; and in case there are more than one correction candidates in the correction candidate list, inputting the user's move command for selection, and replacing the selected candidate substring with the newly input characters.

In another embodiment according to the present invention, a correction method of a word or a character substring is provided. The method includes: determining whether or not a newly input word input by a user exists in a library; in case the newly input word exists in the library, determining whether or not there exist already input words in the same category of the library as the newly input word, and if so, registering such already input words in a correction candidate list; in case there is only one correction candidate in the correction candidate list, replacing the candidate word in the correction candidate list with the newly input word according to a correction command of the user; in case there are more than one correction candidates in the correction candidate list, inputting the user's move command for selection, and replacing the selected candidate word with the newly input word.

In another embodiment according to the present invention, a correction method of a word or a character substring is provided. The method includes: moving a cursor by a user; after determining in which word area the cursor moved by the user is located, recognizing the determined word as a correction candidate word; inputting new characters by the user in the moved cursor location; calculating a correlation between the newly input characters and the character substrings of the correction candidate word having the same length as the newly input characters; in case the correlation exceeds a predetermined value, registering such character substring of the correction candidate word in a correction candidate list; in case there is only one correction candidate in the correction candidate list, replacing the candidate substring in the correction candidate list with the newly input characters according to a correction command of the user; and in case there are more than one correction candidates in the correction candidate list, inputting the user's move command for selection, and replacing the selected candidate substring with the newly input characters.

In another embodiment according to the present invention, a correction method of a word or a character substring is provided. The method includes: moving a cursor by a user; after determining in which word area the cursor moved by the user is located, recognizing the determined word as a correction candidate word; inputting by the user a new word or characters in the moved cursor location; inputting by the user a correction command, then replacing the correction candidate word with the newly input word or character substring, wherein the recognizing the determined word comprises: moving the cursor to a location in the word area starting from the location right before the first character of the correction candidate word to the location right after the last character of the correction candidate word.

In another embodiment according to the present invention, an input device configured to implement one or more of the above methods is provided.

DETAILED DESCRIPTION

Technical Problem

An aspect according to embodiments of the present invention is to solve the problems of the above-described related art technologies. More specifically, an aspect of embodiments according to the present invention is to provide a typing error correction method and a device implementing this method, which does not require inconvenient action of inputting deletion function key like backspace when a user wishes to retype characters for correcting typing error. Furthermore, another aspect according to embodiments of the present invention is to improve convenience when a user moves a cursor for correcting typing errors.

Technical Solution

A technical solution according to embodiments of the present invention will be described in the following. The technical solution according to embodiments of the present invention can be classified into two kinds of technical embodiments or methods. A first embodiment includes a method in which an already input word is corrected by retyping in a current cursor location. A second embodiment includes a method in which the typing error is corrected by retyping after a cursor is moved to a location of the word to be corrected.

First Embodiment

Correcting Typing Error by Retyping in a Current Cursor Location

According to the first embodiment of the present invention, a user does not move a cursor for typing error correction. A user retypes a correct whole word or substring characters of a word in a current cursor location. Thereafter, a correction command is made by a user. It is one of the characteristics of this embodiment that a user can select a correction candidate among a plurality of candidates.

First, a method for correcting a typing error will be described.

Every time when a user inputs characters in the current cursor location, a correlation between the newly input characters and character substrings of already input words having the same length as the newly input characters is calculated. In case the correlation exceeds a reference value (e.g., a predetermined value), such substring of already input word is registered in a correction candidate list. In case that there is only one correction candidate in the list, the candidate substring in the list is replaced by the newly input characters according to a correction command. In case that there are more than one correction candidates in the list, the substring selected by a user is replaced by the newly input characters. A user can select correction candidate to be replaced by the newly input characters by inputting a correction candidate move command.

Next, a method for replacing a word with another word will be explained.

In this method, there should exist a library in which words having similar characteristics are categorized. According to this method, the already input word is replaced by the newly input word using the above library. A user inputs correction command after a user inputs a new word at the current cursor location. If the newly input word exists in the library and an already input word exists in the same category of the library as the newly input word, the already input word is replaced by the newly input word. In case that there are more than one word in the same category, a user's move command is input for selecting a correction candidate, and the selected candidate word is replaced by the newly input word.

Second Embodiment

Correcting Typing Error by Retyping after Moving a Cursor

According to the second embodiment of the present invention, a user does not have to locate the cursor at the exact location where the typing error occurred. Instead, a user can move the cursor in any location of the word to be corrected. Further, a user does not have to input a deletion function key to delete the characters that include a typing error.

First, a method for correcting character substrings including typing error will be described.

A user moves the cursor to any location in an area which is from the location right before the first character of the word to be corrected to the location right after the last character of the word to be corrected. Then, the user inputs new correct characters to correct a typing error. A correlation between the newly input characters and the substrings of already input word having the same length as the newly input characters, where the current cursor is located, is calculated. In case that the correlation exceeds a reference value (e.g., a predetermined value), such substring of the already input word is registered in a correction candidate list. In case there is only one correction candidate in the list, the candidate substring in the list is replaced by the newly input characters according to correction command. In case that there are more than one correction candidate in the list, the candidate substring selected by the user is replaced by the newly input characters. The user can select the correction candidate to be replaced by the newly input characters by inputting a correction candidate move command.

Next, a method for changing a word to another word will be described.

A user moves the cursor to any location in an area which is from the location right before the first character of the word to be corrected to the location right after the last character of the word to be corrected. Then, the user inputs correct characters. If the user inputs a correction command thereafter, the word where the current cursor is located is replaced by the newly input word without any comparison procedure.

According to embodiments of the present invention, it becomes possible to correct typing errors without inputting deletion function keys such as a backspace, thus a fast and convenient error correction becomes possible in comparison with the conventional method of typing error correction. Furthermore, in case that a cursor is moved for correction, the cursor does not have to be located at the accurate location of a typing error of the word. Since the cursor can be located at any location in the word including typing error, a user does not have to pay much attention to accurately locate the cursor, thus a fast and convenient error correction becomes possible.

Figure 1:
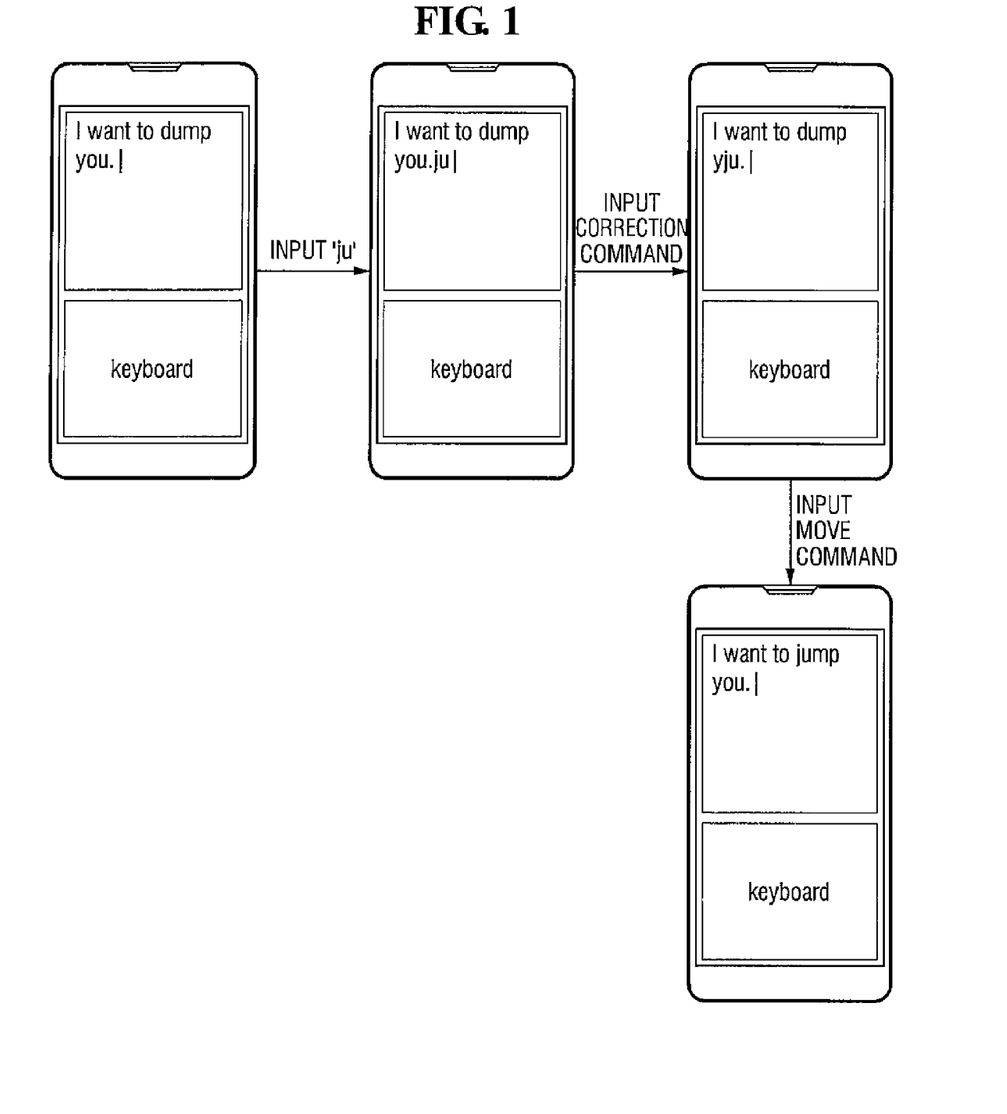
FIG. 1 depicts an embodiment, in which a typing error made at a part of the already input word is corrected and the movement among more than one correction candidates is implemented according to a first embodiment of the present invention.

FIG. 1 depicts an embodiment, in which a typing error made at a part of the already input word is corrected according to the first embodiment of the present invention. A user inputs "I want to dump you" although the user indeed intended to input "I want to jump you." After the user inputs "1 want to dump you," the user recognizes that a typing error has occurred, i.e., "dump" was mistakenly input instead of "jump". Then, the user inputs a space and types "ju." Now, the user's input is "I want to dump you ju." According to the first embodiment, every time when the user inputs new characters, a correlation between the newly input characters and the substrings of the already input word having the same length as the newly input characters is calculated. In this case, since "du" of "dump" and "ou" of "you" are highly correlated with the newly input characters "ju" among the already input words "I," "want," "to," "dump" and "you," the character substrings "du" and "ou" are registered in a correction candidate list. When the user then inputs a correction command, the character substring "ou," which is located nearest to the current cursor location, is first replaced by the newly input characters of "ju.". When the user then inputs a move command for selection, the character substring "du" is secondly replaced by the newly input characters of "ju," and at the same time, the previous correction, i.e., replacement of "ou" of "you" by "ju," the newly input characters, is cancelled. In this way, the correction desired by the user is accomplished.

There may be various methods for calculating the correlation between two series of characters. The following two methods may be used, for example. According to a first method, it is determined whether or not a key located adjacent to another key is input by mistake. When comparing two words "everyone" and "wveryone," the keys corresponding to the first characters "e" and "w" are adjacent to each other on a keyboard. Thus, the correlation may be calculated as being high by considering that different characters between these words locate adjacent to each other on a keyboard. According to the second method, it is determined whether or not an order of two characters is reversed. The second method is based on the fact that two characters are likely to be input in a revered order when they are input in a fast speed. For example, when comparing two words "everyone" and "evreyone," the correlation is calculated as being high by considering that the different characters between these words, i.e., "er" ad "re," are in a reversed order. When inputting a long word, the possibility that the adjacent key is input by mistake or characters are input in a reversed order may increase. Thus, according to embodiments of the present invention, different standards may be applied depending on the length of the word when calculating a correlation. In addition to the ways of determining correlation described above, a new method for determining correlation precisely and quantitatively is provided according to embodiments of the present invention. This innovative and new method for determining correlation is described in a detailed manner in the specification of PCT/KR2013/010910, which was filed on Nov. 28, 2013, the disclosure of which is incorporated herein in its entirety by reference. For example, the correlation determination method disclosed in PCT/KR2013/010910 is incorporated by reference herein.

Figure 2:
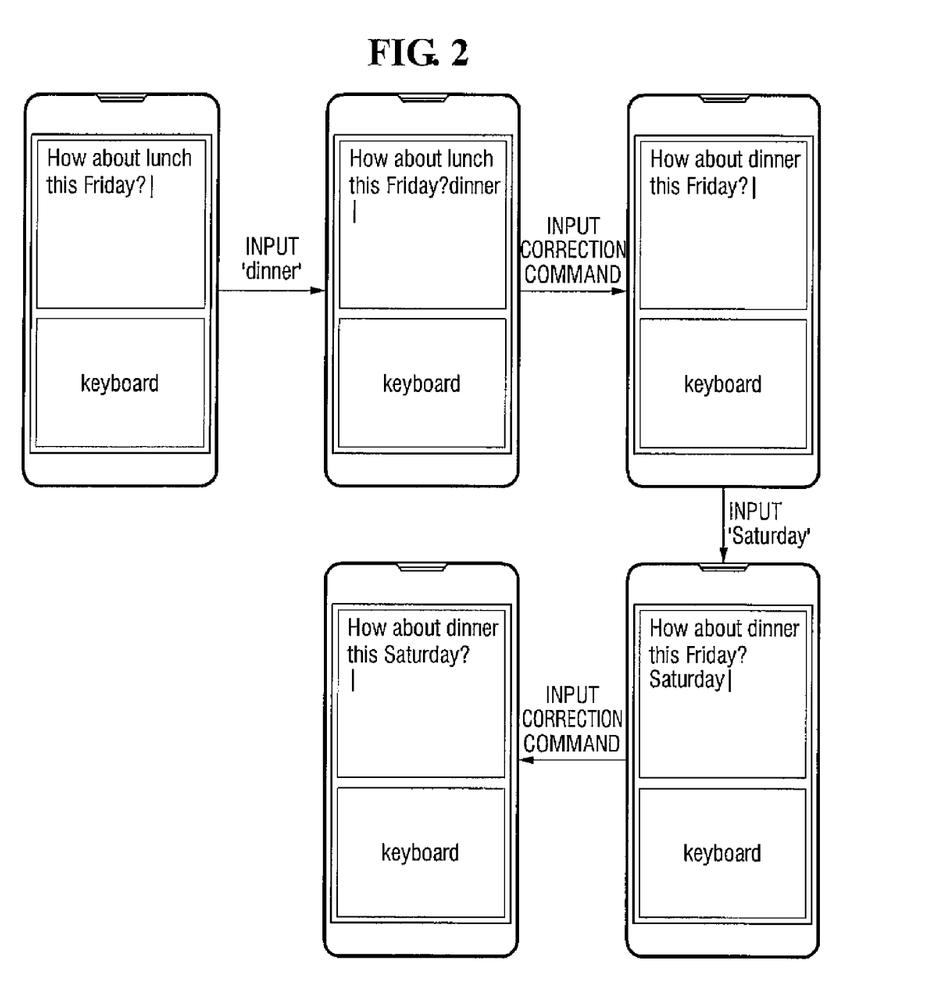
FIG. 2 depicts an embodiment, in which a whole word is replaced according the first embodiment of the present invention.

FIG. 2 depicts an embodiment in which a whole word is newly input to correct an already input whole word. A user correctly inputs "How about lunch this Friday." In this state, if the user wishes to replace the word "lunch" with "dinner," the user inputs a space and types "dinner." Now, the user's input is "How about lunch this Friday dinner." According to the first embodiment of the present invention, a library is provided in which words are categorized according to their characteristics. When a user inputs a new word and then a correction command is made, the already input word is replaced by the newly input word, in case the newly input word is included in the library and similarity exists between the already input word and the newly input word (i.e., if the two words belong to the same category). Because the words "lunch" and "dinner" are listed in the library as having similar characteristics, i.e., they belong to the same category of "meal," the word "lunch" is replaced by "dinner." Another replacement between the words "Friday" and "Saturday" can be implemented in an exactly identical or substantially the same method. In this way, the correction desired by a user is accomplished.

The library including information about similarities among words and categories of words may be based on the technology called "ontology." For example, the words "lunch" and "dinner" may belong to the same category of meal. The words "wear" and "worn" may belong to the same category because they are different tenses of the same word. The words "Friday" and "Saturday" may belong to the same category of the days of a week. Further, a group of synonyms in a dictionary may belong to the same category. The library including information about similarities among words and categories of words may be provided in various ways, which is not limited to those described above.

Figure 3:
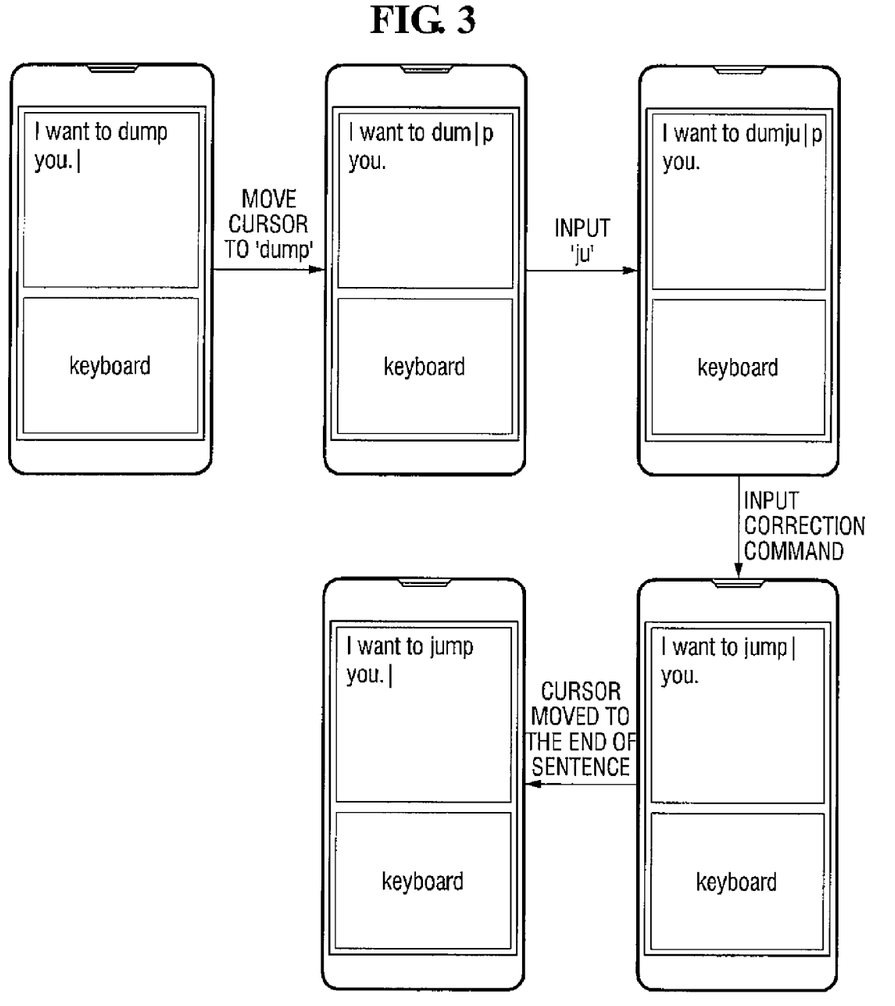
FIG. 3 depicts an embodiment, in which a typing error made at a part of the already input word is corrected according to a second embodiment of the present invention.

FIG. 3 depicts an embodiment in which typing error made at a part of an already input word is corrected according to the second embodiment of the present invention. For example, a user intended to input "I want to jump you" but the user actually inputs "I want to dump you." In the state that the user input is made as "I want to dump you," the user moves a cursor to any location between a location right before the first character "d" and a location right after the last character "p" of the word "dump" by a mouse or touch input (in case of mobile device). If the user then inputs new characters "ju" and the correction command is made, a correlation between the newly input characters, "ju," and the character substrings having the same length within the word "dump" where the cursor locates, is calculated. Since the newly input characters "ju" are determined to be highly related with the character substring "du" of the word "dump," the character substring "du" is registered as a correction candidate, and is replaced by the newly input characters "ju" to complete correction desired by the user. In the embodiment of FIG. 3, if the cursor is moved to locate between the "d" and "u" of the "dump" and then the new character input of "ju" is made, then the whole word reads "djuump." In this case, each character constituting a substring "du" of the already input word, which is highly related with to the new character input of "ju," becomes spaced apart from each other, but this does not affect the procedure for replacing "du" with "ju." This is because the subject to be compared with the characters input after the cursor movement for the correlation calculation is determined as the substrings of "dump" at the time of cursor movement, i.e., before the new character input at the moved cursor location. When the correction is completed by the above-described replacement, the cursor is automatically moved to the end of sentence for facilitating the user's further typing after correction.

Figure 4:
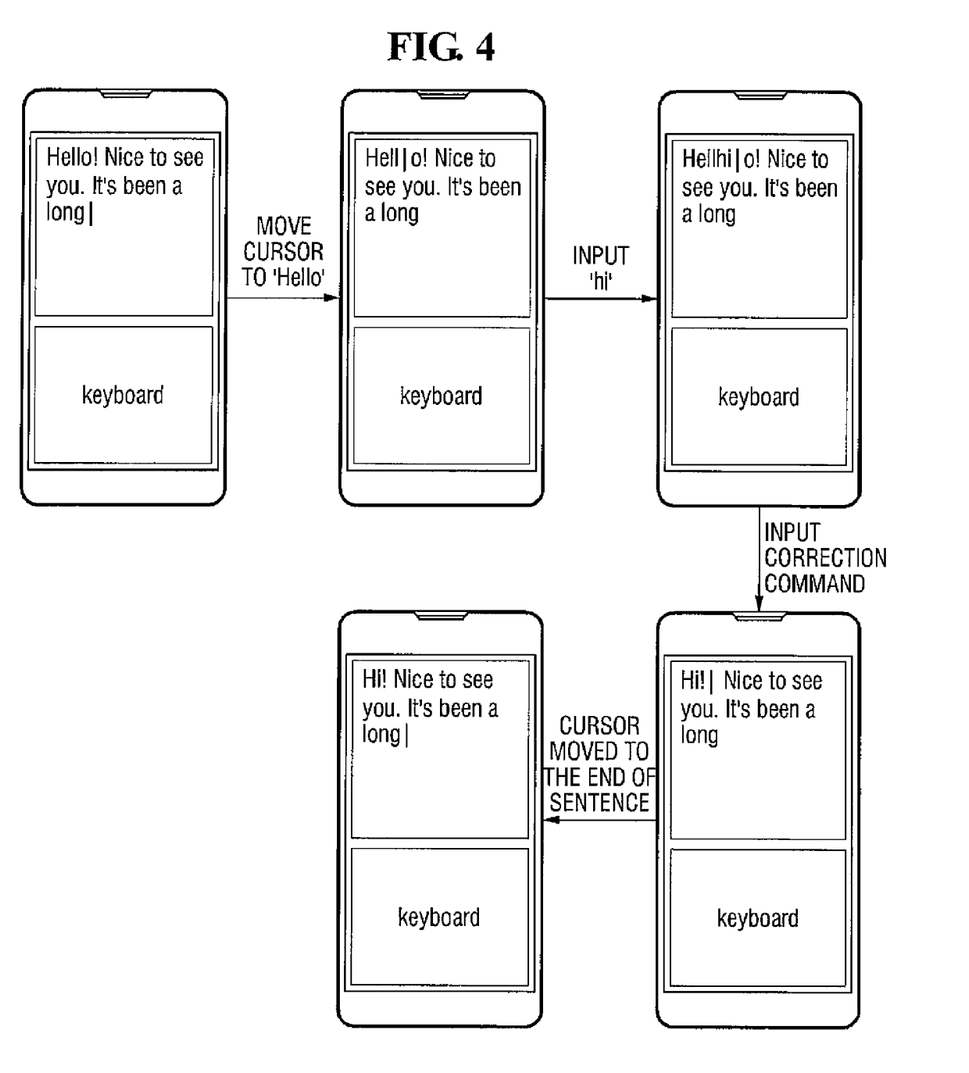
FIG. 4 depicts an embodiment, in which a whole word is replaced according to the second embodiment of the present invention.

FIG. 4 depicts an embodiment in which an already input whole word is corrected according to the second embodiment of the present invention. For example, after a user correctly inputs "Hello Nice to see you It's been a long," the user may wish to replace the word "Hello" with "hi." The user moves the cursor to any location of the word "Hello," i.e., between the location right before the first character "H" and the location right after the last character "o" of the word "Hello." If the user then inputs new characters "hi" and the correction command is made, the word where the cursor locates is replaced by "hi." At this moment, it is further detected that the word after correction, "hi," should be the first word of the sentence. Accordingly, "h" of "hi" is changed to the upper case "H," so that the correction desired by the user is achieved. When the correction is completed by the above-described replacement, the cursor is automatically moved to the end of the sentence for facilitating the user's further typing after correction. Although the embodiments of FIGS. 3 and 4 are similar to each other in that the cursor is moved to any location of the word to be corrected, they are different in the correction scopes. Thus, when the only one kind of the correction command is available, embodiments of FIGS. 3 and 4 should be selectively implemented. In other words, when the embodiment of FIG. 3 is implemented through a correction command, the embodiment of FIG. 4 cannot be implemented through the same command, and vice versa. When the correction command to correct typing error of the substring of the word (FIG. 3) and the correction command to correct the whole word (FIG. 4) are differently provided with the device, the embodiments of FIGS. 3 and 4 may be implemented in combination.

In mobile devices with touchscreens, a user's correction command may be performed by a gesture input like downward or upward dragging within the keyboard area. It can also be performed by a shaking of the device though using an input value from a gyro sensor. Movement between the correction candidates may be performed by repeating the same correction command to move to the next correction candidate. A rightward or leftward gesture on the keyboard area may be recognized as a command to move the correction candidate to the previous one or to the next one. How to implement a user's correction command and to move the correction candidate, is not limited to those described above.

While the present invention has been described herein with reference to certain example embodiments, the present invention is not limited thereto. It will be understood by those of skill in the art that various changes in form and details may be made without departing from the spirit and scope of the present invention as set forth in the following claims, and their equivalents.

The invention claimed is:

1. A correction method of a word or a character substring, the method comprising:
    displaying, on a screen of a device, one or more words in response to input from a user;
    displaying, on the screen of the device, a new character substring in response to input from the user after displaying the one or more words on the screen;
    calculating a correlation between character substrings of the one or more words and the new character substring based on a proximity of keys for the character substrings and keys for the new character substring on a keyboard;
    determining whether or not to register at least one of the character substrings of the one or more words in a correction candidate list based on the calculated correlation;
    receiving a correction command from the user;
    if only one of the character substrings is registered in the correction candidate list, replacing the character substring registered in the correction candidate list with the new character substring, in response to the correction command, such that the new character substring is displayed at a location where the character substring registered in the correction candidate list was displayed; and
    if two or more of the character substrings are registered in the correction candidate list,
        replacing a first character substring of the two or more of the character substrings displayed on the screen with the new character substring, in response to the correction command, such that the new character sub string is displayed at a location where the first character substring was displayed, and
        replacing a second character substring of the two or more of the character substrings displayed on the screen with the new character substring, in response to a move command, such that the new character substring is displayed at a location where the second character substring was displayed.

2. An input device for correcting a word or a character substring according to the method of claim 1.

3. The method of claim 1, wherein the correlation between character substrings of the one or more words and the new character substring is further determined based on a predetermined category of the one or more words and the new character substring in a library to which the one or more words and the new character substring belong.

4. The method of claim 1, wherein the correlation between character substrings of the one or more words and the new character substring is further determined based on a decision whether the character substrings of the one or more words and the new character substring have a reversed order.

5. The method of claim 1, wherein the first character substring of the two or more of the character sub strings is located nearest to the new character substring on the screen among the two or more of the character substrings.

6. A correction method of a word or a character substring, the method comprising:
  displaying, on a screen of a device, one or more words in response to input from a user;
  displaying, on the screen of the device, a new word in response to input from the user after displaying the one or more words on the screen;
  determining whether or not at least one of the one or more words belongs to a same category in a library to which the new word belongs;
  registering the at least one of the one or more words in a correction candidate list when it is determined that the at least one of the one or more words belongs to the same category;
  receiving a correction command input from the user;
  if only one of the one or more words is registered in the correction candidate list, replacing the word registered in the correction candidate list with the new word, in response to the correction command, such that the new word is displayed at a location where the word registered in the correction candidate list was displayed;
  if two or more of the one or more words are registered in the correction candidate list,
    replacing a first word of the one or more words displayed on the screen with the new word, such that the new word is displayed at a location where the first word was displayed; and
    replacing a second word of the one or more words displayed on the screen with the new word, in response to a move command, such that the new word is displayed at a location where the second word was displayed.

7. An input device for correcting a word or a character substring according to the method of claim 6.

8. A correction method of a word or a character substring, the method comprising:
  displaying, on a screen of a device, one or more words in response to input from a user;
  moving a cursor to a correction candidate word of the one or more words displayed on the screen according to a cursor movement command from the user, the cursor being located between a position immediately before a first character constituting the correction candidate word and a position immediately after a last character constituting the correction candidate word;
  displaying, on the screen of the device, a new character substring at a location of the cursor on the screen in response to input from the user after displaying the one or more words on the screen;
  calculating a correlation between character substrings constituting the correction candidate word and the new character substring based on a proximity of keys for the character substrings and keys for the new character substring on a keyboard;
  determining whether or not to register the at least one of the character substrings constituting the correction candidate word in a correction candidate list based on the calculated correlation;
  receiving a correction command input from the user;
  if only one of the character substrings registered in the correction candidate list, replacing the character substring registered in the correction candidate list with the new character substring, in response to the correction command, such that the new character substring is displayed at a location where the character substring registered in the correction candidate list was displayed; and
  if two or more of the character substrings are registered in the correction candidate list:
    replacing a first character sub string of the two or more of the character substrings displayed on the screen with the new character substring, such that the new character substring is displayed at a location where the first character substring was displayed; and
    replacing a second character substring of the two or more of the character substrings displayed on the screen with the new character substring, in response to a move command, such that the new character substring is displayed at a location where the second character substring was displayed.

9. An input device for correcting a word or a character substring according to the method of claim 8.

10. The method of claim 8, wherein the correlation between the character substrings constituting the correction candidate word and the new character substring is further determined based on a predetermined category of the correction candidate word and the new character substring in a library to which the correction candidate word and the new character substring belong.

11. The method of claim 8, wherein the correlation between the character substrings constituting the correction candidate word and the new character substring is further determined based on a decision on whether the character substrings of the correction candidate word and the new character substring have a reversed order.

12. The method of claim 8, further comprising
  moving the cursor to an end of the one or more words on the screen after replacing the character substring registered in the correction candidate list with the new character substring if
  only one of the character substrings is registered in the correction candidate list.

* * * * *